United States Patent [19]

Crocker et al.

[11] E Patent Number: Re. 33,214

[45] Reissued Date of Patent: May 15, 1990

[54] PROCESS FOR CONTROLLED MIXING IN A HIGH INTENSITY MIXER

[75] Inventors: Zenas Crocker, Westmount; Ved P. Gupta, Lasalle, both of Canada

[73] Assignee: Carlew Chemicals Limited, Montreal, Canada

[21] Appl. No.: 252,248

[22] Filed: Apr. 8, 1981

Related U.S. Patent Documents

Reissue of:

[64] Patent No.: 2,306,159
Issued: Oct. 28, 1980
Appl. No.: 962,778
Filed: Nov. 21, 1978

[51] Int. Cl.[5] ..... C08J 3/28

[52] U.S. Cl. ..... 523/303; 366/27; 366/144; 366/145; 366/146; 528/502; 528/503

[58] Field of Search .....260/34.2; 366/77, 144, 366/145, 146; 528/502, 503; 523/303

[56] References Cited

U.S. PATENT DOCUMENTS

| | | | |
|---|---|---|---|
| 2,840,730 | 6/1958 | Jacke | 366/145 |
| 3,062,758 | 11/1962 | Rainer | 528/502 |
| 3,266,738 | 8/1966 | Goeser | 241/98 |
| 4,104,459 | 8/1978 | Hornbäker | 528/501 |
| 4,142,804 | 3/1979 | Crocker | 366/77 |

FOREIGN PATENT DOCUMENTS

| | | |
|---|---|---|
| 1118959 | 9/1966 | Fed. Rep. of Germany . |
| 1604354 | 9/1970 | Fed. Rep. of Germany . |
| 7510890 | 6/1974 | Fed. Rep. of Germany . |
| 1386312 | 3/1975 | United Kingdom . |
| 1478741 | 7/1977 | United Kingdom . |
| 1535545 | 12/1978 | United Kingdom . |

OTHER PUBLICATIONS

Vanzetti, "Fiber Optic Thermal Monitoring and Control Systems".

*Primary Examiner*—Paul R. Michl
*Attorney, Agent, or Firm*—Larson & Taylor

[57] ABSTRACT

An apparatus and a process is disclosed for controlled mixing of a mixable material in a high intensity mixer. The system enables instantaneous, precise and continual monitoring of a batch in a high intensity mixer which heretofore could not be achieved. The process comprises the steps of feeding a batch of material into a high intensity mixer, agitating the batch in the mixer, monitoring batch temperature separately from mixer temperature and discharging the batch from the mixer when the batch temperature reaches a final predetermined level. The apparatus includes means for monitoring batch temperature in a high intensity mixer separately from mixer temperature, and means responsive to the batch temperature to discharge the batch when the batch temperature reaches a final predetermined level.

15 Claims, 1 Drawing Sheet

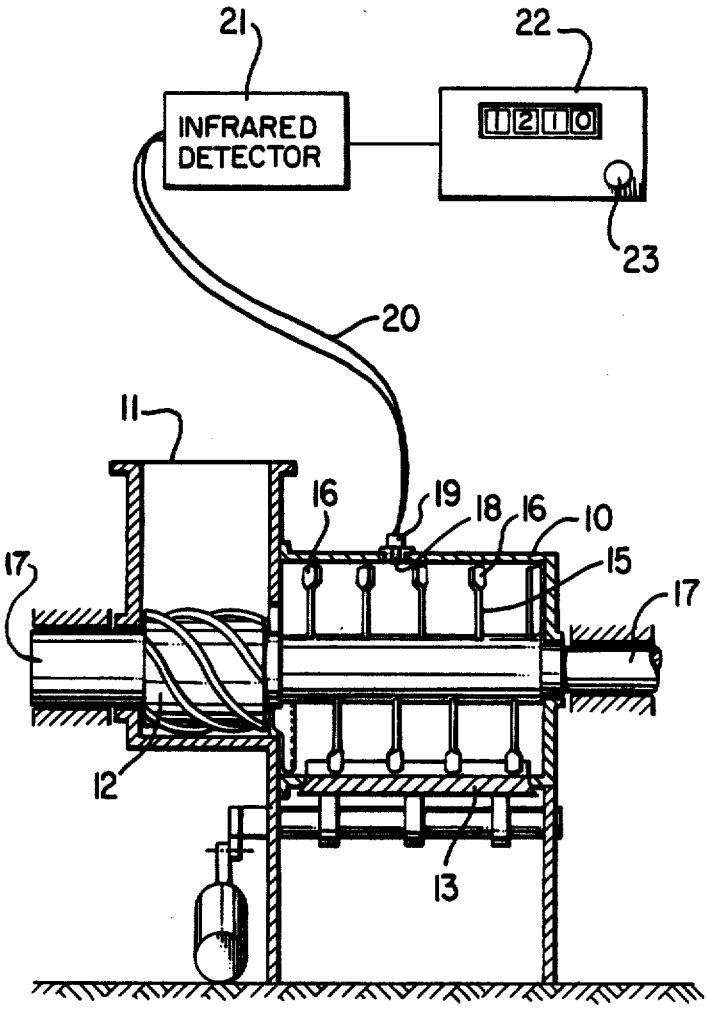
21
22
INFRARED DETECTOR
1210
23
20
11
16
19
18
16
10
15
17
17
12
13

PROCESS FOR CONTROLLED MIXING IN A HIGH INTENSITY MIXER

Matter enclosed in heavy brackets [ ] appears in the original patent but forms no part of this reissue specification; matter printed in italics indicates the additions made by reissue.

This invention relates to high intensity batch mixers and more particularly to a system for continually measuring the batch temperature and controlling the amount of mixing in a high intensity batch mixer based on the batch reaching a desired temperature.

High intensity batch mixers include one or more rotating blades having blade tip speeds of at least ten meters per second, rotating in an enclosed container with a means of feeding material into the mixer and a discharge means, usually a discharge flap. A batch of material in the mixer is heated by the action of the rotating blades striking and impelling the materials to impact on the internal surfaces and other particles in the enclosed container. This action is sometimes referred to as a thermo-kenetic effect or inner frictional heating. Many materials may be mixed in high intensity mixers, and the process of the present invention relates to those materials that can be mixed in a high intensity mixer. Dry blending of materials may take place in a high intensity mixer as well as other types of mixing up to and including fluxing.

One example of the use of high intensity mixers is in the preparation of thermoplastic materials such as polyvinyl chloride. Thermoplastic or thermosetting materials may be mixed and in some cases fluxed in a high intensity mixer. Fluxing refers to mixing in a material until it commences to change its state. This concept is disclosed in German Disclosure Paper No. 1,604,354 published Sept. 10, 1970 by Goeser. One example of a high intensity batch mixer suitable for heating and/or fluxing is disclosed in U.S. Pat. No. 3,266,738 published Aug. 16, 1966 by Goeser et al. In the past, one problem that has always existed with the heating and/or fluxing of materials in a high intensity mixer is to know precisely when a particular temperature of the batch has been reached and to reproduce batch temperatures consistently under a wide range of operating conditions. In the case of fluxing, a particular batch temperature represents a desired state of flux. Furthermore, when a material is fluxed, it has always been difficult to control the state of flux from batch to batch in a high intensity mixer particularly at high speed and high temperature conditions.

One method of overcoming this problem is disclosed in my co-pending application Ser. No. 862,596 (now U.S. Pat. No. 4,142,804) filed Dec. 20, 1977 which is a continuation of application Ser. No. 610,831 filed Sept. 5, 1975 and now abandoned. This application discloses a method of controlling the state of flux of a batch issuing from a mixer by letting the batch in the mixer indicate when it has reached the required state of flux. This was achieved by detecting the change in vibration of the mixer during the mixing step, comparing a vibration signal from the mixer with a predetermined signal and then discharging the batch of material which was at this point fluxed to a predetermined level from the mixer. This process works satisfactorily; however, near the end of the cycle when the material agglomerates and fluxes, the vibration of the mixer body and the blades which are rotating at high speed, reaches such a magnitude that vibration control at high temperatures becomes impractical for precise control. Furthermore, the vibration detection system is only applicable when there is a change of state of the material in the mixer. If there is only an increase in the temperature of the material without fluxing occurring then it may not easily be accurately and instantly detected by known methods such as time, amperage, torque, vibration, etc., under varying operating conditions. There is a need in the use of a high intensity batch mixer to more accurately control and detect fine changes in the temperature or state of the batch with respect to dispersion, absorption and/or agglomeration of ingredients in the batch when mixing and/or fluxing.

It is one purpose of the present invention to provide a method of controlling the amount of mixing of a batch of material in a high intensity batch mixer by continuously monitoring the temperature of the batch in the mixer separately from the temperature of the mixer itself and at desired batch temperatures commencing further additive and/or process steps or discharging the batch from the mixer. Actual batch mixing times may differ from batch to batch due to variations in batch weight, mixer body temperature, batch, wetness or other factors, but the amount of mixing is controlled to achieve the same batch temperature during each cycle. Thus the process is not controlled by time.

Another purpose of the present invention is to operate a high intensity mixer at a shorter average batch time than previous mixing and/or fluxing batch times and thus produce an increase in productivity. This also allows the use of smaller sizes of high intensity mixers to produce the same or higher production capacities than previous mixers, thus reducing the capital investment per unit of production capacity.

Increased cycle rates provides the ability to feed mixed and/or fluxed batches of material at higher temperatures and lower viscosities than formerly possible to other equipment for further processing. This is achieved because the heat history of the batches is shorter than previously attained, and consequently allows the same temperature or hotter feeding at lower viscosity if desirable to further processing steps which in some cases may operate more efficiently at a lower energy requirement. The shorter heat history reduces degradation in time dependent heat sensitive materials.

Yet another purpose of the present invention is to heat high molecular weight viscoelastic materials, such as ultra high molecular weight polyethylenes, in a high intensity mixer. Such materials are difficult to heat quickly by other means and in some cases have to be sintered into a particular form or shape. The present invention provides a process for heating such materials so they may be shaped or formed without sintering.

In one embodiment of the present invention, thermoplastic materials, such as polyvinyl chloride, may be more quickly and fully fluxed in a fluxing type high intensity batch mixer having higher tip speeds than previously known. Due to the more accurate control of the mixing based on temperature, the cycle rates may be reduced.

Another embodiment of the present invention provides a system that continuously monitors the temperature of a batch of material in a high intensity batch mixer and performs the mixing in a series of stages dependent upon batch temperature.

Until the present invention, it has not been possible to accurately and instantaneously distinguish the temperature of the batch from that of the mixer or temperature measuring device. It has now been found that the temperature of the batch can be distinguished from the mixer by using an optical fiber system in conjunction with an infrared detector system. Thermocouples which in the past have been used for measuring heat inside a mixer do not distinguish the temperature of the batch from the temperature of the mixer or thermocouple itself and furthermore, have a slow response to temperature change because the thermocouple measures the temperature of the thermocouple body and not the batch within the mixer. The temperature of the vessel may vary from batch to batch. A batch of material in a high intensity mixer may reach a desired fluxing temperature in a few seconds, but due to the mass of the mixer, which is greater than the mass of the batch, the mixer temperature changes more slowly than the batch. Initially when a first batch is mixed, the temperature of the mixer may be cold and heats up at a slower rate than an individual batch. This restricts the use of timing as a reproducible control system. Also, after a number of batches have been mixed, the temperature of the mixer may be higher than the starting temperature of a batch. Thus, the purpose of the present invention is to monitor the temperature of a batch of material inside the mixer separately from the temperature of the mixing container and mixer rotating blades. Another advantage of this batch temperature control system is to allow immediate start-ups at the beginning of a production run without the use of reheating systems.

In the case of thermoplastic materials such as polyvinyl chloride, it has been known for some time that the temperature of the material is directly related to the state of flux of that material. Thus, if the temperature of the thermoplastic material can be instantly, accurately and continually measured and the batch discharged from a mixer without a time lag and at controlled temperatures, even when the temperature is increasing at exponential rates, higher rotational speeds of the mixer blades may be used and thus produce shorter but controlled mixine times. Short mixing times result in a higher production rate from a high intensity mixer and produce short batch heat histories for improved efficiency in further process steps. In the case of a high intensity mixer manufactured by Draiswerke GMBH and sold under the trade mark Gelimat, normal tip speeds have been in the order of 20 to 25 meters/-second. Higher speeds have not generally been feasible because of problems of temperature control at discharge. The present invention allows tip speeds in this type of high intensity mixer above 25 meters/second reaching 45 meters/second or even higher which increases the cycle rates considerably. The batch temperature control system of the present invention also permits other types of high intensity mixers than the Gelimat to be operated at normal or higher tip speeds with precise temperature control. Furthermore, the batch temperature control system controls the precise temperature of the batch regardless of the batch size or regardless of size variations between batches.

The present invention provides a process for controlled mixing of a mixable material in a high intensity batch mixer comprising the steps of, feeding a batch of the material into the mixer, agitating the batch of the material in the mixer, monitoring batch temperature separately from the mixer temperature and, if provided, a temperature sensing device in the mixer, and discharging the batch from the mixer when the batch temperature reaches a final predetermined level.

In one embodiment of the present invention, additives may be fed to the mixer at predetermined batch temperatures prior to the batch temperature reaching the final predetermined level.

In a still further embodiment the material to be mixed is a time dependent heat sensitive material, a plurality of mixing blades rotate during the agitating step to produce a tip speed above 25 meters per second, and the time the batch remains in the mixer is less than 30 seconds.

The present invention also provides an apparatus for controlled mixing of a mixable material comprising, a high intensity batch mixer for agitating a batch of the material, means for monitoring batch temperature of the batch in the mixer and separately from mixer temperature and temperature sensing device in the mixer, and means responsive to the batch temperature to discharge the batch from the mixer when the batch temperature reaches a final predetermined level. In one embodiment there are a plurailty of mixing blades that rotate in the mixer to produce a tip speed above 25 meters per second.

In a drawing which illustrates one embodiment of the invention, a longitudinal section view of the machine is shown with a means of monitoring the batch temperature.

Referring now to the drawing, a high intensity batch mixer 10 is shown with an entry trough 11 having a screw feed 12 therein. The high intensity mixer 10 has a hinged discharge flap 13 at its base thereof. Cutting and mixing arms 15 with blades 16 at the end thereof are arranged along a shaft 17 which is an extension of the screw feed 12. The shaft 17 is rotated at high speed from a suitable motor.

A protective window 18 located in the collet 19 is positioned in the wall of the mixer 10 so that it faces towards the batch being mixed in the mixer 10. In one embodiment using a Gelimat high intensity mixer, a protective window 18 was placed in the top of the cylindrical wall of the mixer so that it transmitted infrared radiation from the batch when mixing and stayed free of blockage.

An optical fiber cable 20 leads from the window 18 in the collet 19 to an infrared detecting head 21. Infrared radiation from the batch is instantly and continuously transmitted through the window 18, along the optical fiber cable 20 and is converted to a voltage in the detecting head 21. This conversion occurs every few milliseconds or as frequently as desired or obtainable on the particular equipment, thus the voltage represents a continual signal representing batch temperature. The voltage is a function of the infrared radiation and hence the temperature of the batch and voltage or temperature may be displayed on a digital display panel 22. An adjustable control switch 23 is provided to set the voltage limit, which is in effect temperature, and a signal representing this voltage limit opens the discharge flap 13 allowing the batch to pass on to further processing. In another embodiment, a plurality of signals may be generated at increasing temperatures to represent different activities or other process steps throughout the batch cycle. The time lag from the detection of the temperature of the batch in the mixer to the issuance of a signal representing the voltage limit is a matter of milliseconds.

The FIGURE illustrates one embodiment of a high intensity mixer which has a screw feed to the mixing chamber. Such a mixer allows batch operation without stopping the rotating shaft. In some instances, however, it is preferred to have a mixer without a screw feed which has a charge flap and a discharge flap. The rotating shaft is then stopped between batches.

In another embodiment a recording device such as a millivolt strip chart recorder is attached to the detecting head 21 and calibrated to read voltage or temperature on a time base. Thus batch times and batch cycles are recorded as well as temperature or voltage.

In operation, a batch of material is fed into the entry trough 11 and the screw feed 12 feeds the batch into the mixing chamber of the mixer 10 where the mixer blades 16 at the end of the arms 15 rotate at high speed to strike and impel the material. This action produces heat and the temperature of the batch of material increases. The infrared radiation which is a function of the temperature of the batch in the mixer is detected through the window 18, converted to voltage, and if desired is displayed as voltage or temperature on the digital display panel 22. Then, when the material reaches a predetermined temperature, set by the control switch 23, a signal representing this predetermined temperature indicates the end of the mixing stage, the discharge flap 13 opens and the material is discharged from the mixer 10.

The protective window 18 is positioned to be cleaned by the motion of the fast moving pieces of material inside the mixer 10. The protective window 18 may be formed from sapphire, diamond or any other suitable abrasion resistant material that transmits infrared radiation.

In another embodiment a multiple stage mixing process is carried out when, for example, it is necessary to add one or more ingredients to the batch at various stages of the process. The temperature sensing system may be set to activate the addition of an additive at a predetermined temperature. An example of additives added to thermoplastic resins such as polyvinyl chloride, is foaming agents which may be added late in the mixing process to avoid premature foaming in the mixer. Furthermore, a batch temperature can be set to discharge the batch just below foaming temperature. In some processes, cross linking agents may be added initially or when the batch reaches a predetermined temperature before the final discharge temperature. When a high intensity mixer is used for dry blending, various ingredients such as stabilizers, lubricants, impact modifiers and fillers may be added at different temperatures.

Ultra high molecular weight polyethylene or other such polymers may be heated in a high intensity mixer so that they can be shaped in a further process step. It has been found that polyethylene having a molecular weight above 2,000,000 and preferably in the range of 2,000,000 to 6,000,000 may be heated in a short time to the desired state for further processing. In some cases these materials are processed in a lengthy sintering technique whereby the particles are heated in place over heating periods that can require several hours. The same temperatures may be achieved in the present process in a few seconds. Other high molecular weight materials may also be processed in a high intensity mixer with the precise batch temperature control system.

In another embodiment a plurality of small high intensity batch mixers may be automatically controlled to operate in sequence one after the other so that the discharging step of each mixer occurs in sequence, and an even flow of material may be fed for further processing. In such an arrangement, each of the high intensity mixers may be connected to a common feed and discharge conveyor. In a still further embodiment a plurality of small high intensity mixers may be used in or out of sequence to flux thermoplastic material and produce a high volume of fluxed material with a short heat history exposure.

EXAMPLE 1

Batches weighing approximately 48 pounds of a preblended mixture of a PVC homopolymer resin, stabilizer, lubricant, filler, impact modifier and colorants were sequentially charged to a Dariswerke "Gelimat" high intensity mixer having a blade tip speed of 29 meters per second. The Gelimat was fitted with the temperature control system shown in the drawing and the temperature cut off was set for 410° F. Each batch was mixed to a fully fluxed state and automatically discharged from the Gelimat when the batch temperature reached 410° F. The batches were then conveyed to pelletizing equipment and formed into an opaque rigid PVC injection molding compound. The mixing times averaged out at 24 seconds per batch.

EXAMPLE 2

A number of batches each weighing approximately 0.85 pounds of a preblended mixture of a PVC homopolymer resin, stabilizer, lubricant, impact modifier and colorants designated Carlew Chemicals' CGP-1100 were sequentially charged, one after the other, to two Draiswerke Gelimat high intensity mixers having blade tip speeds of 27 meters per second. Both Gelimats were fitted with the temperature control system shown in the drawing and the temperature cut off was set at 426° F. Each batch was mixed to a fully fluxed state and automatically discharged from the Gelimat when the batch temperature reached 426° F. A common feed system fed batches to the two Gelimats in order, and a common conveyor system below both Gelimats conveyed the discharged batches to finishing equipment which formed a continuous clear rigid PVC sheet 0.010 inches thick by 22 inches wide for thermoforming into blister packages. The mixing times averaged out at 10 seconds per batch.

EXAMPLE 3

Batches weighing approximately 0.66 pounds of an ultra high molecular weight polyethylene powder, identified as Hostalen GUR412 were sequentially charged to a Draiswerke Gelimat high intensity mixer having a blade tip speed of 41 meters per second. The Gelimat was fitted out with the temperature control system shown in the drawing and the temperature cut off was set for 390° F. Each batch was mixed until the batch temperature reached 390° F. and was then automatically discharged from the Gelimat. The hot batches were fed to a molding press and formed into a sheet 0.125 inches thick. The mixing times averaged out at 18 seconds per batch.

EXAMPLE 4

Batches of a preblended mixture of PVC homopolymer resin, stabilizer, lubricant, filler, plasticizer and colorants, each weighing approximately 30 pounds, were sequentially charged into a Draiswerke Gelimat high intensity mixer having a blade tip speed of 43 meters per second. The Gelimat was fitted with the temperature control system shown in the drawing and the temperature cut off was set for 320° F. Each batch was mixed to a fully fluxed state and automatically discharged from the Gelimat when the batch temperature reached 320° F. The batches were then conveyed to pelletizing equipment and formed into an opaque flexible PVC compound used for wire insulation. The mixing times averaged out at 7 seconds per batch.

EXAMPLE 5

Batches weighing approximately 48 pounds of a preblended mixture of PVC homopolymer resin, stabilizer, lubricant, filler, impact modifier and colorants were sequentially charged to a Draiswerke Gelimat high intensity mixer having a blade tip speed of 29 meters per second. The Gelimat was fitted with the temperature control system shown in the drawing and the temperature cut off was set at a desired temperature. Each batch was mixed to a homogeneous hot powder condition and automatically discharged from the Gelimat when the batch reached the desired temperature. The batches were then conveyed to compounding the pelletizing equipment to form an opaque rigid PVC compound for extrusion into profiles. The mixing times averaged out at 22 seconds per batch.

EXAMPLE 6

Batches of a preblended PVC homopolymer resin, stabilizer, lubricant, filler, plasticizer and colorants, each weighing approximately 30 pounds, were sequentially charged into a Draiswerke Gelimat high intensity mixer having a blade tip speed of 29 meters per second. The Gelimat was fitted with the temperature control system shown in the drawing and the temperature cut off was set for 317° F. Each batch was mixed to a fully fluxed state and automatically discharged from the Gelimat when the batch temperature reached 317° F. The mixing times averaged out at 14 seconds per batch. In a second run of the same material, the blade tip speed was then increased to 43 meters per second. The batches were mixed under precisely the same conditions as the first run, and the mixing times for the second run averaged out at 8 seconds per batch.

Various changes may be made to the scope of the present application without departing from the spirit of the invention which is only limited by the claims.

The embodiments of the invention in which an exclusive property or privilege is claimed are defined as follows:

1. A process for controlled mixing of a *thermoplastic or thermosetting* mixable *particulate* material in a high intensity batch mixer, comprising the steps of, feeding a batch of the *thermoplastic or thermosetting particulate* material into the mixer, agitating the batch of the material in the mixer *with mixing blades having tip speeds above 25 meters per second,*

*continuously* monitoring the infrared radiation produced by the batch of material so as to determine *instantaneously* the temperature of the batch of material separately from the temperature of the mixer, and discharging the batch from the mixer *with a minimum time lag* when the batch temperature, *determined by the infrared radiation produced by the batch of material,* reaches a ∫final predetermined level] *preset level so as to produce uniform batches of mixed materials having short heat histories, optimum processing and physical property characteristics.*

[2. A process for controlled mixing of a mixable material in a high intensity batch mixer, comprising the steps of, feeding a batch of the material into the mixer, agitating the batch of the material in the mixer, monitoring the infrared radiation produced by the batch of material so as to determine the batch temperature separately from mixer temperature and temperature sensing device in the mixer, and discharging the batch from the mixer when the batch temperature reaches a final predetermined level.

3. The process according to claim 1 [or claim 2] wherein monitoring the infrared radiation of the batch is accomplished through the use of an optical fiber system.

4. The process according to claim 1 [or claim 2] wherein monitoring the infrared radiation of the batch is accomplished through the use of an optical fiber system, wherein the infrared radiation is converted to a voltage representing temperature and wherein, when the voltage reaches a final predetermined level, the batch is discharged from the mixer.

5. The process according to claim 4 wherein the voltage is shown visually on a digital display representing temperature.

6. The process according to claim 1 [or claim 2] wherein the material is a thermoplastic or thermosetting material, and the predetermined level of the batch temperature represents a desired degree of mixing and/or fluxing of the material.

7. The process according to claim 1 [or claim 2] including feeding additives to the mixer at predetermined batch temperatures prior to the batch temperature reaching the final predetermined level.

8. The process according to claim 1 [or claim 2] wherein the material is ultra high molecular weight polyethylene having a molecular weight above 2,000,000.

9. The process according to claim 1 [or claim 2] wherein the material is ultra high molecular weight polyethylene having a molecular weight in the range of 2,000,000 to 6,000,000.

10. The process according to claim 1 wherein the high intensity batch mixer is a Draiswerke Gelimat mixer and wherein a plurality of mixing blades rotate during the agitating step to produce a blade tip speed above 25 meters per second.

11. The process according to claim 10 wherein the batch is a mixture of polyvinyl chloride resin plus stabilizers and suitable additives, and time from commencing the agitating step to discharging the batch in a fully fluxed state is approximately 10 seconds.

12. The process according to claim 10 wherein the batch is a mixture of polyvinyl chloride resin plus stabilizers and suitable additives, and time from commencing the agitating step to discharging the batch in a fully fluxed state is approximately 25 seconds.

13. The process according to claim 10 wherein the batch is a mixture of polyvinyl chloride resin, stabilizers, plasticizers and other suitable additives, and time from commencing the agitating step to discharging the batch in a fully fluxed state is approximately 7 seconds.

14. The process according to claim 10 wherein the batch is an ultra high molecular weight polyethylene powder, the blade tip speed is approximately 41 meters per second and time from commencing the agitating step to discharging the batch at a temperature of approximately 390° F. is approximately 18 seconds.

15. The process according to claim 1 [or claim 2] including a plurality of several small high intensity batch mixers.

16. The process according to claim 1 [or claim 2] wherein the material is a time dependent heat sensitive material, the high intensity batch mixer has a plurality of mixing blades that rotate during the agitating step to produce a tip speed above 25 meters per second, and the mixing time the batch remains in the mixer is less than 30 seconds.

* * * * *

UNITED STATES PATENT AND TRADEMARK OFFICE

CERTIFICATE OF CORRECTION

PATENT NO. : Re. 33,214

DATED : May 15, 1990

INVENTOR(S) : CROCKER et al

It is certified that error appears in the above-identified patent and that said Letters Patent is hereby corrected as shown below:

On the cover page, after "[64] Patent No.:" please delete:

"2,306,159"

and substitute therefor:

--4,230,615--.

Signed and Sealed this

Twenty-third Day of July, 1991

*Attest:*

*Attesting Officer*

HARRY F. MANBECK, JR.

*Commissioner of Patents and Trademarks*

UNITED STATES PATENT AND TRADEMARK OFFICE

CERTIFICATE OF CORRECTION

PATENT NO. : Re. 33,214

DATED : May 15, 1990

INVENTOR(S) : CROCKER et al

It is certified that error appears in the above—identified patent and that said Letters Patent is hereby corrected as shown below:

Column 3, line 31, delete "reheating" and insert --preheating--

Column 7, line 67, delete "]" and insert --[--

Column 8, line 13, after "level." insert --]--

Signed and Sealed this

Seventeenth Day of September, 1991

*Attest:*

HARRY F. MANBECK, JR.

*Attesting Officer*

*Commissioner of Patents and Trademarks*